United States Patent [19]

Orikasa et al.

[11] Patent Number: 5,175,204
[45] Date of Patent: Dec. 29, 1992

[54] THERMOPLASTIC RESIN COMPOSITION AND METHOD FOR PREPARING THE SAME

[75] Inventors: Yuichi Orikasa, Yokohama; Suehiro Sakazume, Fujisawa, both of Japan

[73] Assignee: Nippon Petrochemicals Co., Ltd., Tokyo, Japan

[21] Appl. No.: 207,396

[22] Filed: Jun. 16, 1988

[30] Foreign Application Priority Data

Jun. 16, 1987 [JP] Japan .................. 62-149331
Oct. 13, 1987 [JP] Japan .................. 62-257680

[51] Int. Cl.$^5$ ............................... C08L 67/02
[52] U.S. Cl. ...................... 524/504; 525/64; 525/166
[58] Field of Search ............ 525/64, 166, 68; 524/504

[56] References Cited

U.S. PATENT DOCUMENTS 4,172,859  10/1979  Epstein ................. 428/402
4,461,871   7/1984  Kometani et al. .......... 525/166
4,659,767   4/1987  Dunkle .................. 524/504

FOREIGN PATENT DOCUMENTS 1552637  5/1976  United Kingdom .

*Primary Examiner*—Patricia Short
*Attorney, Agent, or Firm*—Ostrolenk, Faber, Gerb & Soffen

[57] ABSTRACT

There is here provided a thermoplastic resin composition which comprises (I) 50 to 99% by weight of an aromatic polyester resin, and (II) 50 to 1% by weight of a multi-phase structure thermoplastic resin which is composed of 5 to 95% by weight of at least one ethylene copolymer selected from the group consisting of epoxy group-containing ethylene copolymers, ethylene-unsaturated carboxylic acids, alkyl ester copolymers and metallic salts of the ethylene-unsaturated carboxylic acids, and ethylene-vinyl ester copolymers, and 95 to 5% by weight of a vinyl polymer or copolymer obtained from at least one vinyl monomer, either of both the components possessing a dispersion phase where each particle has a diameter of 0.001 to 10 μm. A method for preparing the above-mentioned thermoplastic resin composition is also provided here.

20 Claims, 2 Drawing Sheets

FIG. 1

E-GMA-g-PMMA  ⟵⟶ 1μm

FIG. 2

E-GMA-MMA  ⟵⟶ 1μm

FIG. 3

E-GMA / PMMA ⊢—⊣ 1 μm

FIG. 4

E-GMA-g-MMA ⊢—⊣ 1 μm

THERMOPLASTIC RESIN COMPOSITION AND METHOD FOR PREPARING THE SAME

BACKGROUND OF THE INVENTION (1) Field of the Invention

The present invention relates to a thermoplastic resin composition which can provide molded articles having excellent mechanical properties, particularly improved impact resistance, and a method for preparing the same. This composition of the present case can be widely utilized as materials for industrial parts, electrical and electronic machine parts, automobile parts and the like.

(2) Description of the Prior Art

Aromatic polyester resins typified by polyethylene terephthalate resin and polybutylene terephthalate resin are excellent in mechanical properties, heat resistance, chemical resistance and the like but are poor in impact resistance, particularly notched impact strength. Therefore, improvement has been attempted. In the following examples of many attempts, the impact resistance is improved to some extent: a method for blending a copolymer which comprises monomers such as an α-olefin and an α,β-unsaturated acid glycidyl ester disclosed in Japanese Patent Unexamined Publication No. 51-144452 (U.S. Pat. No. 4,172,859), WO 85/03718, WO 85/05117, U.S. Pat. No. 4,461,871 and Japanese Patent Unexamined Publication Nos. 52-32045 and 53-117049; a method for blending a modified polymer prepared by graft-reacting a monomer such as an α,β-unsaturated acid glycidyl ester to a copolymer comprising an α-olefin and a non-conjugated diene disclosed in Japanese Patent Unexamined Publication No. 60-40154; and a method for blending a modified polymer prepared by graft-polymerizing an α,β-unsaturated dicarboxylic acid, dicarboxylic anhydride, an imide derivative or the like to a copolymer of ethylene and an α-olefin having 3 or more carbon atoms disclosed in Japanese Patent Publication No. 57-54058.

However, the above modified α-olefin copolymer as an improver of impact resistance is a substantially rubbery polymer and has a glass transition temperature of room temperature or less. Therefore, in order to heighten the impact resistance, it is conceived to increase the amount of the modified α-olefin copolymer, but if the content of the latter is merely increased, heat resistance which is one of characteristics of the aromatic polyester resins, deteriorates.

In addition, molded articles of the aromatic polyester resin with which the above-mentioned α-olefin copolymer is blended have the excellent impact resistance immediately after molding, but when the molded articles are, for example, annealed to remove strain generated during the molding, the impact resistance becomes extremely degrade.

The inventors of the present application have intensively conducted research with the intention of eliminating the conventional drawback, and they have found that a thermoplastic resin composition prepared by blending an aromatic polyester resin with a specific thermoplastic resin having a multi-phase structure can improve impact resistance, maintaining heat resistance high, and can have improved impact strength even after annealing, and that the new thermoplastic resin composition can be effectively manufactured by melting and kneading the raw materials at a specific temperature. In consequence, the present invention has been completed on the basis of this knowledge.

SUMMARY OF THE INVENTION

The first aspect of the present invention is directed to a thermoplastic resin composition containing (I) 50 to 99% by weight of an aromatic polyester resin, and (II) 50 to 1% by weight of a multi-phase structure thermoplastic resin which is composed of 5 to 95% by weight of at least one ethylene copolymer selected from the group consisting of epoxy group-containing ethylene copolymers, ethylene-unsaturated carboxylic acids, alkyl ester copolymers and metallic salts of the ethylene-unsaturated carboxylic acids, and ethylene-vinyl ester copolymers, and 95 to 5% by weight of a vinyl polymer or copolymer obtained from at least one vinyl monomer, either of both the components being formed with a dispersion phase having a particle diameter of 0.001 to 10 μm.

The second aspect of the present invention is directed to a method for preparing a thermoplastic resin composition which comprises the step of melting and mixing an aromatic polyester resin (I) with 1 to 100% by weight of a graft polymerization precursor (A) which is obtained by first adding at least one vinyl monomer, at least one radical polymerizable or copolymerizable organic peroxide and a radical polymerization initiator to an aqueous suspension of at least one ethylene copolymer selected from the group consisting of epoxy group-containing ethylene copolymers, ethylene-unsaturated carboxylic acids, alkyl ester copolymers and metallic salts of the ethylene-unsaturated carboxylic acids, and ethylene-vinyl ester copolymers, then heating the suspension under such conditions that the decomposition of the radical polymerization initiator does not occur substantially, in order to impregnate the ethylene copolymer with the vinyl monomer, the radical polymerizable or copolymerizable organic peroxide and the radical polymerization initiator, and raising the temperature of this aqueous suspension, when the degree of the impregnation has reached 50% by weight of the original weight of the vinyl monomer, peroxide and initiator, in order to copolymerize the vinyl monomer with the radical polymerizable or copolymerizable organic peroxide in the ethylene copolymer, 0 to 99% by weight of at least one ethylene copolymer (B) selected from the group consisting of epoxy group-containing ethylene copolymers, ethylene-unsaturated carboxylic acids, alkyl ester copolymers and metallic salts of the ethylene-unsaturated carboxylic acids, and ethylene-vinyl ester copolymers, and 0 to 99% by weight of a vinyl polymer or copolymer obtained by polymerizing at least one vinyl monomer, or alternatively melting and mixing the components (A), (B) and (C) previously at a temperature in the range of 100° to 300° C., and then melting and mixing the resulting mixture with the aromatic polyester resin (I).

BRIEF DESCRIPTION OF THE FIGURES

GMA). This photograph is indicated with E-GMA-g-PMMA (multi-phase structure thermoplastic resin).

DETAILED DESCRIPTION OF THE INVENTION

An aromatic polyester resin used in the present invention is a polyester having an aromatic ring in a chain unit of the polymer, and in other words, it is a polymer or copolymer prepared by subjecting the main components of an aromatic dicarboxylic acid (or a derivative capable of forming the ester) and a diol (or a derivative capable of forming the ester) to a condensation reaction.

Examples of the above-mentioned aromatic dicarboxylic acid include terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyl ether dicarboxylic acid, 1,2-bis(phenoxy)ethane-4,4'-dicarboxylic acid and derivatives capable of forming the aromatic polyester.

Furthermore, examples of the diol include aliphatic diols each having 2 to 10 carbon atoms, such as ethylene glycol, propylene glycol, 1,4-butanediol, neopentyl glycol, 1,5-pentanediol, 1,6-hexanediol, decamethylene diglycol and cyclohexanediol; and long-chain glycols each having a molecular weight of 400 to 6,000, such as polyethylene glycol, poly-1,3-propylene glycol, polytetramethylene glycol and mixtures thereof.

Typical and preferable examples of the aromatic polyester resin used in the present invention include polyethylene terephthalate, polypropylene terephthalate, polybutylene terephthalate, polyhexamethylene terephthalate, polyethylene-2,6-naphthalate and polyethylene-1,2-bis(phenoxy)ethane-4,4'-dicarboxylate. More preferable aromatic polyester resins are polyethylene terephthalate and polybutylene terephthalate.

The intrinsic viscosity of the aromatic polyester can be measured at 25°±0.1° C. at a polyester concentration of 0.32 g in 100 ml of a mixture of trifluoroacetic acid and methylene chloride in a ratio of 25:75. Preferably, the intrinsic viscosity is in the range of 0.4 to 4.0 dl/g. When the intrinsic viscosity is less than 0.4 dl/g, the aromatic polyester cannot exert sufficient mechanical strength unpreferably. Inversely, when it is in excess of 4.0 dl/g, the flowability of the aromatic polyester deteriorates in melting the latter, so that luster on the surface of molded articles thereof degrades.

The ethylene copolymer used in the multi-phase structure thermoplastic resin regarding the present invention is at least one ethylene copolymer selected from the group consisting of epoxy group-containing ethylene copolymers, ethylene-unsaturated carboxylic acids, alkyl ester copolymers and metallic salts of the ethylene-unsaturated carboxylic acids, and ethylene-vinyl ester copolymers. The ethylene copolymer may be preferably prepared by a high-pressure radical polymerization.

The above-mentioned epoxy group-containing ethylene copolymer is a copolymer of ethylene and an unsaturated glycidyl group-containing monomer, or a terpolymer of ethylene, an unsaturated glycidyl group-containing monomer and another unsaturated monomer.

Examples of the unsaturated glycidyl group-containing monomer include glycidyl acrylate; glycidyl methacrylate; itaconic acid monoglycidyl ester; butenetricarboxylic acid monoglycidyl ester; butenetricarboxylic acid diglycidyl ester; butenetricarboxylic acid triglycidyl ester; vinyl-glycidyl ethers and vinyl glycidyl esters of maleic acid, crotonic acid and fumaric acid; allyl glycidyl ether; glycidyloxy ethylvinyl ether; glycidyl ethers such as styrene p-glycidyl ether; and p-glycidyl styrene. The particularly preferable ones are glycidyl methacrylate and acrylic glycidyl ether.

Other examples of the unsaturated monomers include the undermentioned unsaturated carboxylic acid alkyl esters and vinyl esters, and olefins. Typical examples of the olefins include propylene, butene-1, hexene-1, decene-1, octene-1 and styrene.

Furthermore, typical examples of the unsaturated carboxylic acid monomers of ethylene-unsaturated carboxylic acids, their alkyl ester copolymers and ethylene-vinyl ester copolymers include unsaturated carboxylic acids such as acrylic acid, methacrylic acid, maleic acid, fumaric acid, maleic anhydride and itaconic anhydride; unsaturated carboxylic acid alkyl ester monomers such as methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, monomethyl maleate, monoethyl maleate, diethyl maleate and monomethyl fumarate; and vinyl ester monomers such as vinyl propyonate, vinyl acetate, vinyl caproate, vinyl caprylate, vinyl laurate, vinyl stearate and vinyl trifluoroacetate.

Particularly preferable ones are ethyl acrylate and vinyl acetate. These monomers may be used in the form of a mixture thereof.

Moreover, in the present invention, the ethylene polymers include copolymers prepared by additionally modifying low-, medium- and high-density polyethylenes and ethylene-α-olefin copolymers with the above-mentioned unsaturated carboxylic acids such as acrylic acid, maleic acid and maleic anhydride, and ion-cross-linked ethylene copolymers prepared by reacting the above-mentioned random or grafted copolymers with monovalent, divalent and trivalent metallic compounds of the groups I, II, III, IV-A and VI of the periodic table.

Examples which are desirable as the above-mentioned metallic compounds are nitrates, acetates, oxides, hydroxides, methoxides, ethoxides, carbonates and bicarbonates of the above metals.

Examples of the metallic ions include $K^+$, $Na^+$, $Ca^{++}$, $Mg^{++}$, $Zn^{++}$, $Ba^{++}$, $Fe^{++}$, $Fe^{+++}$, $Co^{++}$, $Ni^{++}$ and $Al^{+++}$. Of these metallic ions, $Na^+$, $Mg^{++}$ and $Zn^{++}$ are particularly preferred. These various metallic compounds can be used in an optional combination thereof. These ethylene copolymers may be used as a mixture thereof.

Typical examples of the epoxy group-containing ethylene copolymer include ethylene-glycidyl methacrylate copolymer; ethylene-vinyl acetate-glycidyl methacrylate copolymer; ethylene-ethyl acrylate-glycidyl methacrylate copolymer; ethylene-carbon monoxide-glycidyl methacrylate copolymer; ethylene-glycidyl acrylate copolymer; and ethylene-vinyl acetate-glycidyl acrylate copolymer. Above all, ethylene-glycidyl methacrylate copolymer is preferred.

In addition, other examples of the epoxy group-containing ethylene copolymers include modified compounds prepared by subjecting undermentioned ethylene homopolymers or copolymers and the above-mentioned unsaturated glycidyl group-containing monomers to addition reaction.

That is, examples of the ethylene homopolymers and copolymers which perform the addition reaction with the above-mentioned unsaturated glycidyl group-containing monomers include low-density, medium-density and high-density polyethylenes; ethylene-propylene copolymer; ethylene-butene-1 copolymer; ethylene-hexene-1 copolymer; ethylene-4-methylpentene-1 copolymer; copolymers with other α-olefins mainly comprising ethylene such as ethylene-octene-1 copolymer; ethylene-vinyl acetate copolymer; ethylene-acrylic acid copolymer; ethylene-methacrylic acid copolymer; copolymers of ethylene and methyl, ethyl, propyl, isopropyl and butyl acrylate and methacrylate; ethylene-maleic acid copolymer; ethylene-propylene copolymer rubber; ethylene-propylene-diene-copolymer rubber; ethylene-vinyl acetate-vinyl chloride copolymer; mixtures thereof; and mixtures of these compounds and other synthetic resins or rubbers.

The above-mentioned ethylene copolymer may be prepared preferably by a high-pressure radical polymerization. That is, the ethylene copolymer may be prepared by simultaneously or stepwise contacting and polymerizing a monomer mixture of 60 to 99.5% by weight of ethylene, 0.5 to 40% by weight of one or more unsaturated glycidyl group-containing monomer, and 0 to 39.5% by weight of at least one other unsaturated monomer, with a monomer mixture of 50 to 99.5% by weight of ethylene, 50 to 0.5% by weight of at least one monomer selected from the group consisting of unsaturated carboxylic acids, their alkyl esters and vinyl esters, and 0 to 49.5% by weight of another unsaturated monomer in the presence of 0.0001 to 1% by weight of a radical polymerization initiator based on the total weight of all the monomers at a polymerization pressure of 500 to 4,000 kg/cm², preferably 1,000 to 3,500 kg/cm², at a reaction temperature of 50° to 400° C., preferably 100° to 350° C., using a chain transfer agent and, if necessary, some auxiliaries in an autoclave or tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; halogen-substituted hydrocarbons such as chloroform and carbon tetrachloride; saturated aliphatic alcohols such as methanol, ethanol, propanol and isopropanol; saturated aliphatic carbonyl compounds having 1 to 20 or more carbon atoms such as carbon dioxide, acetone and methyl ethyl ketone; and aromatic compounds such as toluene, diethylbenzene and xylene.

Typical examples of the vinyl polymer and copolymer in the multi-phase structure thermoplastic resin used in the present invention include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, and α-substituted styrene such as α-methylstyrene and α-ethylstyrene; acrylate and methacrylate monomers, for example, alkyl esters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate; acrylamide and methacrylamide monomers; and monoesters and diesters of maleic anhydride and maleic acid. Above all, the vinyl aromatic monomers are particularly preferable.

The multi-phase structure thermoplastic resin used in the present invention is an ethylene copolymer or a vinyl polymer or copolymer matrix in which another vinyl polymer or copolymer, or ethylene copolymer is uniformly dispersed in a spherical form.

The polymer dispersed in the matrix has a particle diameter of 0.001 to 10 μm, preferably 0.01 to 5 μm. When the particle diameter of the dispersed polymer is less than 0.001 μm or is more than 10 μm, the dispersibility of the polymer is bad in dispersing the latter in the aromatic polyester resin, with the result that, for example, the appearance of articles made therefrom deteriorates or the improvement effect of impact resistance is unpreferably insufficient.

The vinyl polymer or copolymer in the multi-phase thermoplastic resin used in the present invention has a number average polymerization degree of 5 to 10,000, preferably 10 to 5,000.

When the number average polymerization degree is less than 5, heat resistance of the thermoplastic resin composition of the present invention declines unpreferably, though impact resistance can be improved. Inversely, when it is in excess of 10,000, melting viscosity is high, moldability deteriorates, and surface luster falls off unpreferably.

The multi-phase thermoplastic resin used in the present invention comprises 5 to 95% by weight, preferably 20 to 90% by weight, of the ethylene copolymer. Therefore, the content of the vinyl polymer or copolymer is 95 to 5% by weight, preferably 80 to 10% by weight.

When the content of the ethylene copolymer is less than 5% by weight, the compatibility effect of the ethylene copolymer in the aromatic polyester resin is poor, and inversely when it is in excess of 95% by weight, heat resistance and dimensional stability of the blended product is impaired unpreferably.

As a grafting technique used to prepare the multiphase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, water is suspended in 100 parts by weight of at least one ethylene copolymer selected from the group consisting of epoxy group-containing ethylene copolymers, ethylene-unsaturated carboxylic acids, alkyl ester copolymers and metallic salts of the ethylene-unsaturated carboxylic acid, and ethylene-vinyl ester copolymers. Afterward, 5 to 400 parts by weight of at least one vinyl monomer is added to the suspension, and into the mixture, a solution is poured in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator in which the decomposition temperature to obtain a half-life period of 10 hours is from 40° to 90° C. The mixture is then heated under conditions that the decomposition of the radical polymerization initiator does not occur substantially, in order to impregnate the ethylene copolymer with the vinyl monomer, the radical polymerizable or copolymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the ethylene copolymer, thereby obtaining a graft polymerization precursor (A). This graft polymerization precursor (A) also is the multi-phase structure thermoplastic resin.

Therefore, the thus obtained graft polymerization precursor (A) may be directly melted and mixed with the aromatic polyester resin, but the most preferable multi-phase thermoplastic resin (II) can be obtained by kneading the graft polymerization precursor.

That is, grafting is achieved by kneading the graft polymerization precursor (A) with melting at 100° to 300° C. in order to prepare the multi-phase structure thermoplastic resin. Alternatively, the ethylene copolymer (B) or the vinyl polymer or copolymer (C) may be mixed with the graft polymerization precursor, and the mixture may be then kneaded under melting to obtain the multi-phase structure thermoplastic resin.

The above-mentioned radical polymerizable or copolymerizable organic peroxides are compounds represented by the general formulae (a) and (b):

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2.

Typical examples of the radical polymerizable or copolymerizable organic peroxides represented by the general formula (a) include t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylperoxyacryloyloxyethyl carbonate, t-butylperoxymethacryloyloxyethyl carbonate, t-amylperoxymethacryloyloxyethyl carbonate, 1,1,3,3-tetramethylbutylperoxymethacryloyloxyethyl carbonate, cumylperoxymethacryloyloxyethyl carbonate, p-isopropylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropylperoxyacryloyloxyethoxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylperoxymethacryloyloxyethoxyethyl carbonate, t-butylperoxyacryloyloxyisopropyl carbonate, t-amylperoxymacryloyloxyisopropyl carbonate, t-hexylperoxyacryloyloxyisopropyl carbonate, 1,1,3,3-tetramethylbutylperoxyacryloyloxyisopropyl carbonate, cumylperoxyacryloyloxyisopropyl carbonate, p-isopropylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3-tetramethylbutylperoxymethacryloyloxyisopropyl carbonate, cumylperoxymethacryloyloxyisopropyl carbonate, p-isopropylperoxymethacryloyloxyisopropyl carbonate.

Typical examples of the compounds represented by the general formula (b) include t-butylperoxyallyl carbonate, t-amylperoxyallyl carbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethallyloxyisopropyl carbonate, t-hexylperoxymethallyloxyisopropyl carbonate.

Of these compounds, preferable ones are t-butylperoxyacryloyloxyethyl carbonate, t-butylperoxymethacryloyloxyethyl carbonate, t-butylperoxyallyl carbonate and t-butylperoxymethallyl carbonate.

In the present invention, there is required 50 to 99% by weight, preferably 60 to 95% by weight, of the aromatic polyester resin. Therefore, the multi-phase structure thermoplastic resin is blended therewith in an amount of 50 to 1% by weight, preferably 40 to 5% by weight.

When the content of the aromatic polyester resin is less than 50% by weight, mechanical strength and heat resistance deteriorate. Inversely when it is more than 99% by weight, it is impossible to achieve the improvement of impact resistance which is the purpose of the present invention.

In the present invention, the inorganic filler (III) can be blended in an amount of 0 to 150 parts by weight based on 100 parts by weight of the resin component containing the above-mentioned components (I)+(II).

The inorganic filler may be used in granular, lamellar, scaly, needle, spherical, balloons and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

Furthermore, in the present invention, the thermoplastic resin composition can be brought into a flame resistant state by blending therewith a flame retardant (IV) in an amount of 5 to 150 parts by weight based on 100 parts by weight of the thermoplastic resin composition (I)+(II).

As the flame retardants, there can be used organic flame retardants of halogen series and phosphorus series, and inorganic flame retardants.

The halogen series flame retardants include brominated and chlorinated paraffins such as tetrabromobisphenol (TBA), hexabromobenzene, decabromodiphenyl ether, tetrabromoethane (TBE), tetrabromobutane (TBB) and hexabromocyclodecane (HBCD), chlorine series flame retardants such as chlorinated polyphenyl, chlorinated polyethylene, chlorinated diphenyl, perchloropentacyclodecane and chlorinated naphthalene, usual halogen series flame retardants such as halogenated diphenyl sulfides, halogenated polystyrenes such as brominated polystyrene, brominated poly-α-methylstyrene and derivatives thereof, halogenated polycarbonates such as brominated polycarbonates, halogenated polyesters such as polyalkylene tetrabromoterephthalate and brominated terephthalic acid series polyesters, halogenated epoxy compounds such as halogenated bisphenol series epoxy resins, halogenated polyphenylene oxide compounds such as poly(dibromophenylene oxide), and high-molecular type halogen-containing polymers such as cyanuric acid ester compounds of halogenated bisphenols.

Of these flame retardants, oligomers and polymers of the aromatic halides are particularly preferred.

In addition, phosphorus series flame retardants include phosphates and halogenated phosphates such as tricresyl phosphate, tri($\beta$-chloroethyl) phosphate, tri(-dibromopropyl) phosphate and 2,3-dibromopropyl-2,3-chloropropyl phosphate, phosphonic acid compounds and phosphonic acid derivatives.

Examples of other flame retardants include guanidine compounds such as guanidine nitride.

The above-mentioned organic flame retardants may be used alone or as a mixture of two or more thereof.

The organic flame retardant is used in an amount of 5 to 50 parts by weight, preferably 7 to 40 parts by weight based on 100 parts by weight of the thermoplastic resin composition (I)+(II).

When the content of the flame retardant is less than 5 parts by weight, the flame-resistive effect is poor, and when it is more than 50 parts by weight, the flame-resistive effect is not improved any more and the cost rises.

These organic flame retardants, particularly halogen series flame retardants can exert a synergistic effect, when used together with a flame-resistive auxiliary.

Examples of the flame-resistive auxiliary include antiomony halides such as antimony trioxide, antimony pentaoxide, antimony trichloride and antimony pentaoxide, and antimony compounds such as antimony trisulfide, antimony pentasulfide, sodium antimonate, antimony tartrate and metallic antimony.

In addition, examples of the inorganic flame retardants used in the present invention include aluminum hydroxide, magnesium hydroxide, zirconium hydroxide, basic magnesium carbonate, dolonite, hydrotalcite, calcium hydroxide, barium hydroxide, hydrate of stannous hydroxide, hydrates of inorganic metallic compounds of borax and the like, zinc borate, zinc metaborate, barium metaborate, zinc carbonate, magnesium-calcium carbonate, calcium carbonate, barium carbonate, magnesium oxide, molybdenum oxide, zirconium oxide, stannous oxide and red phosphorus. These inorganic flame retardants may be used alone or as a mixture of two or more thereof. Of these flame retardants, hydrates of metallic compounds of aluminum hydroxide, magnesium hydroxide, zirconium hydroxide, basic magnesium carbonate, dolonite, hydrotalcite are particularly preferable. Above all, aluminum hydroxide and magnesium hydroxide are effective as the flame retardants and are economically advantageous.

The particle diameter of the inorganic flame retardant depends upon its kind, but in the cases of aluminum hydroxide and magnesium hydroxide, the average particle diameter is 20 $\mu$m or less, preferably 10 $\mu$m or less.

The inorganic flame retardant is used in an amount of 30 to 150 parts by weight, preferably 40 to 120 parts by weight based on 100 parts by weight of the thermoplastic resin composition (I)+(II).

When the content of the inorganic flame retardant is less than 30 parts by weight, the flame-resistive effect is poor in its single use, and thus it is necessary to add the organic flame retardant thereto. Inversely, when it is more than 150 parts by weight, impact strength and mechanical strength deteriorate.

In the present invention, the above-mentioned inorganic filler and flame retardant may be employed simultaneously, whereby the content of the flame retardant can be decreased, and other characteristics can be acquired additionally.

In the preparation of the thermoplastic composition of the present invention, melting and mixing are carried out at a temperature of 150° to 350° C., preferably 180° to 320° C. When the above temperature is less than 150° C., the melting is insufficient, melting viscosity is high, the mixing is poor, and the resin tends to peel off in a layer state unpreferably. Inversely when it is in excess of 350° C., decomposition and gelation of the resin take place inconveniently.

In melting and mixing, there may be used a usual kneader such as a Bumbury's mixer, a pressure kneader, a kneading extruder, a biaxial extruder and rolls.

In the present invention, there may be additionally used other thermoplastic resins such as polyolefin resins, polyvinyl chloride resin, polyvinylidene chloride resin, polycarbonate resin, polyamide resin, polyphenylene ether resin, polyphenylene sulfide resin and polysulfone resin; rubbers such as a natural rubber and a synthetic rubber; and additives such as an antioxidant, an ultraviolet inhibitor, a lubricant, a dispersant, a foaming agent, a crosslinking agent and a colorant.

PREPARATION EXAMPLE 1

Preparation of Multi-phase Structure Thermoplastic Resin IIa

In a 5-liter stainless steel autoclave was placed 2,500 g of pure water, and 2.5 g of polyvinyl alcohol was dissolved therein as a suspending agent. In the solution was placed 700 g of ethylene-glycidyl methacrylate copolymer as an epoxy group-containing ethylene copolymer (trade name Rexpearl J-3700; made by Nippon Petrochemicals Co., Ltd.), followed by stirring to suspend the copolymer therein. Separately, in 300 g of methyl methacrylate as a vinyl monomer were dissolved 1.5 g of benzoylperoxide as a radical polymerization initiator (trade name Nyper-B; made by Nippon Oils & Fats Co., Ltd.), 6 g of t-butylperoxymethacryloyloxyethyl carbonate as a radical polymerizable or copolymerizable organic peroxide and 0.6 g of n-dodecylmercaptan as a molecular weight modifier, and the resulting solution was then placed in the above-mentioned autoclave, followed by stirring. Afterward, the autoclave was heated up to a temperature of 60° to 65° C., and stirring was then continued for 2 hours, so that the epoxy group-containing ethylene copolymer was impregnated with the vinyl monomer containing the radical polymerization initiator and the radical polymerizable or copolymerizable organic peroxide. After it had been confirmed that the total amount of the impregnated vinyl monomer, radical polymerizable or copolymerizable organic peroxide and radical polymerization initiator was 50% by weight or more of the original total weight thereof, the temperature of the mixture was raised up to a level of 80° to 85° C., and this temperature was then maintained for 7 hours to complete polymerization, followed by water washing and drying, thereby obtaining a graft polymerization precursor. The methyl methacrylate polymer was extracted from this graft polymerization precursor with ethyl acetate, and according to measurement by the use of GPC, the number average polymerization degree of the methyl methacrylate polymer was 700.

Next, this graft polymerization precursor was extruded at 200° C. by a plastomill monoaxial extruder (Toyo Seiki Seisaku-sho Ltd.) to perform graft reaction, whereby a multi-phase structure thermoplastic resin IIa was obtained.

Figure 1:
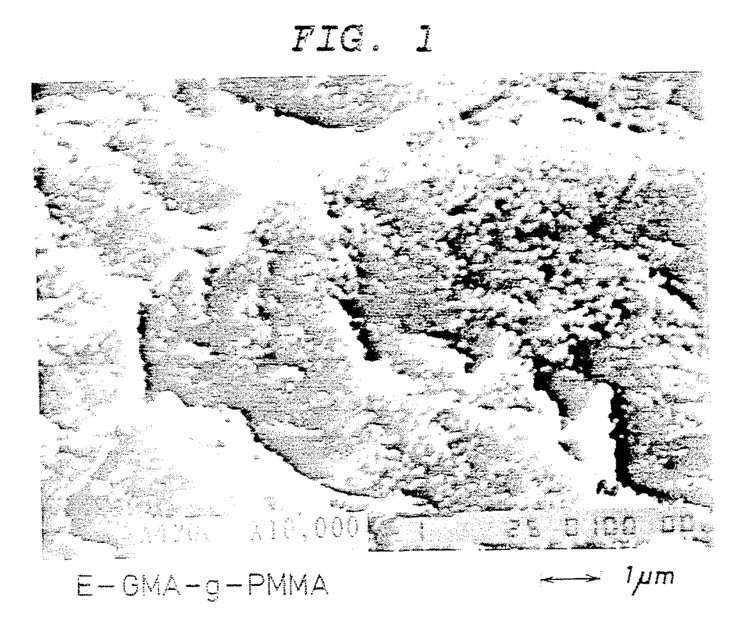
FIG. 1 is the electron microscope photograph of a multi-phase structure thermoplastic resin prepared in Preparation Example 1 in which spherical methyl methacrylate polymer particles having a diameter of 0.1 to 0.2 μm are dispersed in a base polymer matrix comprising ethylene-glycidyl methacrylate copolymer (E-

This multi-phase structure thermoplastic resin was then observed by a scanning type electron microscope (trade name JEOL JSM T300; made by JEOL, Ltd.), and it was found that it was a multi-phase structure thermoplastic resin in which spherical resin particles each having a diameter of 0.1 to 0.2 μm were uniformly dispersed, as seen in FIG. 1.

In this case, the grafting efficiency of the methyl methacrylate polymer was 68.8% by weight.

REFERENCE EXAMPLE 1

Preparation of Random Copolymer

Figure 2:
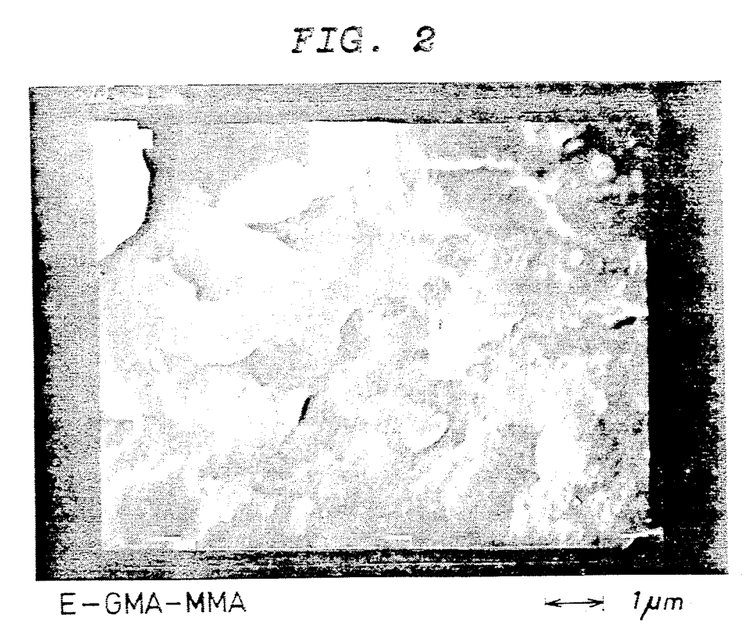
FIG. 2 is the electron microscope photograph of a random terpolymer (Reference Example 1) of an ethylene-glycidyl methacrylate (GMA)-methyl methacrylate prepared by high-pressure radical polymerization. This photograph is indicated with E-GMA-MMA (random terpolymer).

In a 3.8-liter reactor equipped with a stirrer were placed a mixture of 1,600 g of ethylene, 32 g of glycidyl methacrylate and 40 g of methyl methacrylate, and in the presence of 200 g of n-hexane as a chain transfer agent and 0.0012% by weight of a radical polymerization initiator (di-tert-butyl peroxide) based on the total weight of the mixture, reaction was then performed at a polymerization pressure of 1,600 kg/cm$^2$ and a reaction temperature of 170° C., thereby obtaining a ethylene-glycidyl methacrylate-methyl methacrylate random terpolymer. FIG. 2 shows the observational result of the random terpolymer by the use of an electron microscope.

The results indicate that the random copolymer does not have such a multi-phase structure as in the present invention.

REFERENCE EXAMPLE 2

Preparation of Blend

Figure 3:
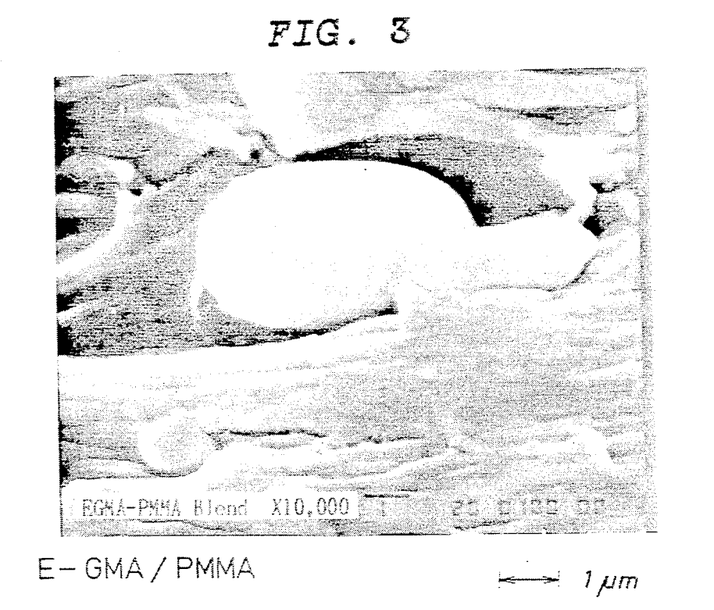
FIG. 3 is the electron microscope photograph of a blend composition (Reference Example 2) which is prepared by first blending E-GMA used in Preparation Example 1 with 30% by weight of polymethyl methacrylate (PMMA) and then mixing them with melting. This photograph is indicated with E-GMA/PMMA (blend polymer).

The epoxy group-containing ethylene copolymer used in Preparation Example 1 was blended with 30% by weight of polymethyl methacrylate (trade name Acrypet MD; made by Mitsubushi Rayon Co., Ltd.), and they were mixed at 250° C. under melting. The blend was observed through an electron microscope, and the results are shown in FIG. 3.

In the blend, the particle size of the dispersed polymethyl methacrylate is great, and therefore the structure of the polymer is noticeably different from the multi-phase structure of the present invention.

REFERENCE EXAMPLE 3

In a high-speed shear mixer, 950 g of ethylene-glycidyl methacrylate copolymer used in Preparation Example 1 was mixed, at ordinary temperature for 5 minutes, with a solution in which 0.5 g of dicumyl peroxide (trade name Percumyl D; made by Nippon Oils & Fats Co., Ltd.) dissolved in 50 g of methyl methacrylate. The mixture was then extruded at 200° C. by an extruder, and graft reaction was performed in a usual grafting manner in order to obtain a short-chain graft polymer. The structure of the thus obtained graft polymer can be observed from the electron microscope photograph of FIG. 4.

Figure 4:
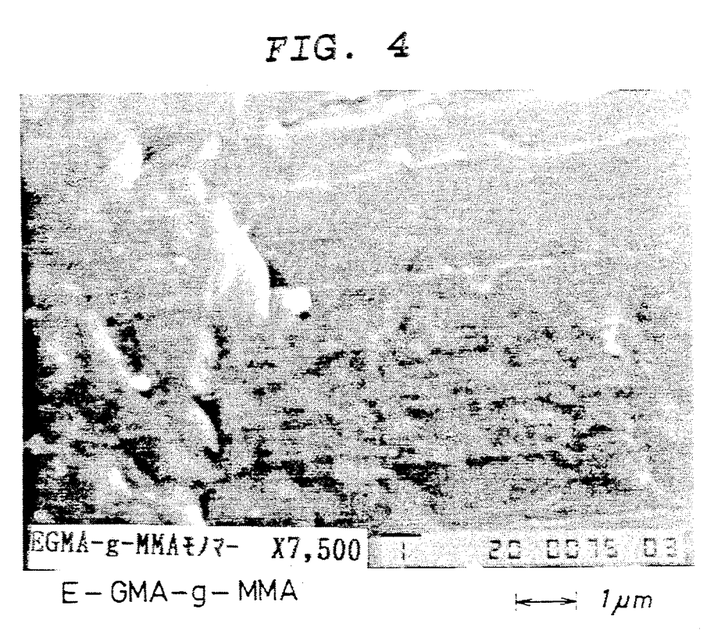
FIG. 4 is the electron microscope photograph of a short-chain graft polymer prepared by reacting E-GMA copolymer used in Preparation Example 1 with methyl methacrylate in a usual grafting manner. This photograph is indicated with E-GMA-g-MMA (short-chain graft polymer).

The results in the photograph indicate that the above-mentioned short-chain graft polymer does not have such a multi-phase structure as seen in the polymer prepared in Preparation Example 1, but a single-phase structure.

PREPARATION EXAMPLE 2

Preparation of Multi-phase Structure Thermoplastic Resin IIb

The same procedure as in Preparation Example 1 was repeated with the exception that 300 g of the methyl methacrylate monomer as a vinyl monomer was replaced with 300 g of styrene and a n-dodecylmercaptan as a molecular weight modifier was not used, thereby preparing multi-phase structure thermoplastic resin IIb.

In this case, the number average polymerization degree of the prepared styrene polymer was 900, and the average diameter of the resin particles dispersed in this resin composition was from 0.3 to 0.4 μm.

PREPARATION EXAMPLE 3

Preparation of Thermoplastic Resin IIc

The same procedure as in Preparation Example 2 was repeated with the exception that 300 g of styrene as a vinyl monomer was dissolved in 300 g of benzene as a solvent and that 2.5 g of n-dodecylmercaptan was used as a molecular weight modifier, in order to obtain a graft polymerization precursor, and a thermoplastic resin IIc was then prepared therefrom. In this case, the number average polymerization degree of the styrene polymer was 4.1. This thermoplastic resin was observed by an electron microscope, and it was found that the diameter of the dispersed resin particles seemed to be 0.001 μm or less, as shown in FIG. 4, but this was not confirmed.

PREPARATION EXAMPLE 4

Preparation of Multi-phase Structure Thermoplastic Resin IId

The same procedure as in Preparation Example 1 was repeated with the exception that ethylene-glycidyl methacrylate copolymer as an epoxy group-containing ethylene copolymer was replaced with ethylene-ethyl acrylate copolymer (content of ethyl acrylate=20% by weight) (trade name Rexlon EEA A-4200; made by Nippon Petrochemicals Co., Ltd.), in order to obtain a graft polymerization precursor (polymerization degree of methyl methacrylate=700), and finally a multi-phase structure thermoplastic resin IId was prepared.

As in Preparation Example 1, the thus prepared multi-phase structure thermoplastic resin was observed through an electron microscope, and it was found that spherical resin particles each having a diameter of 0.1 to 0.2 μm were uniformly dispersed therein.

In this case, the grafting efficiency of the methyl methacrylate polymer was 65.7%.

PREPARATION EXAMPLE 5

Preparation of Multi-phase Structure Thermoplastic Resin IIe

The same procedure as in Preparation Example 4 was repeated with the exception that 300 g of the methyl methacrylate monomer as a vinyl monomer was replaced with 300 g of styrene and that a n-dodecylmercaptan as a molecular weight modifier was not used, thereby preparing multi-phase structure thermoplastic resin IIe.

In this case, the number average polymerization degree of the prepared styrene polymer was 900, and the average particle size of the resin particles dispersed in this resin composition was from 0.3 to 0.4 μm.

PREPARATION EXAMPLE 6

The same procedure as in Preparation Example 5 was repeated with the exception that 300 g of styrene as a vinyl monomer was dissolved in 300 g of benzene as a solvent and that 2.5 g of n-dodecylmercaptan was used as a molecular weight modifier, in order to obtain a graft polymerization precursor, and a thermoplastic resin IIf was then prepared therefrom. In this case, the number average polymerization degree of the styrene polymer was 4.2. This thermoplastic resin was observed by an electron microscope, and it was found that the diameter of the dispersed resin particles seemed to be 0.001 μm or less, but this was not confirmed.

EXAMPLES 1 to 6

Polyethylene terephthalate having an intrinsic viscosity of 2.2 dl/g was dry-blended with a predetermined amount of multi-phase structure thermoplastic resin IIa or IIb prepared in Preparation Examples 1 and 2, and they were then mixed by a plastomill monoaxial extruder (Toyo Seiki Seisaku-sho Ltd.) a temperature of which was set to 250° C. Afterward, specimens were prepared therefrom by an injection molding machine having a cylinder temperature of 250° C., and there were measured notched Izod impact strength at 25° C., notched Izod impact strength after annealing at 150° C. for 3 hours, and heat distortion temperature under a load of 18.6 kg/cm². The results are set forth in Table 1.

Test procedures were as follows:
(1) Izod impact strength (notched): JIS K7110 (ASTM D256)
(2) Heat distortion temperature: JIS K7207 (ASTM D648)

TABLE 1

| Example | 1 | 2 | 3 | 4 | 5 | 6 |
|---|---|---|---|---|---|---|
| Polyethylene Terephthalate (wt %) | 95 | 90 | 80 | 70 | 90 | 70 |
| Multi-phase Structure Thermoplastic Resin IIa (wt %) | 5 | 10 | 20 | 30 | — | — |
| Multi-phase Structure Thermoplastic Resin IIb (wt %) | — | — | — | — | 10 | 30 |
| Notched Izod Impact Strength before Annealing (kg · cm/cm) | 5.8 | 6.6 | 9.1 | 15.4 | 5.9 | 13.1 |
| Notched Izod Impact Strength after Annealing (kg · cm/cm) | 6.5 | 7.3 | 10.7 | 15.1 | 6.1 | 12.7 |
| Heat Distortion Temperature (°C.) | 83 | 81 | 77 | 70 | 82 | 73 |

COMPARATIVE EXAMPLE 1 to 7

The same procedure as in Example 1 was repeated with the exception that the multi-phase structure thermoplastic resins were replaced with ethylene-glycidyl methacrylate-ethyl acrylate terpolymer (glycidyl methacrylate content=5% by weight and ethyl acrylate content=10% by weight) (trade name Rexpearl JS 4450; made by Nippon Petrochemicals Co., Ltd.) and the unmodified epoxy group-containing ethylene copolymer used in Preparation Example 1. The results are set forth in Table 2.

TABLE 2

| Comp. Example | 1 | 2 | 3 | 4 | 5 | 6 | 7 |
|---|---|---|---|---|---|---|---|
| Polyethylene Terephthalate (wt %) | 100 | 90 | 80 | 70 | 90 | 80 | 70 |
| Unmodified Epoxy Group-Containing Ethylene Copolymer (wt %) | 0 | 10 | 20 | 30 | 0 | 0 | 0 |
| Ethylene-Glycidyl Methacrylate-Ethyl Acrylate Terpolymer (wt %) | 0 | 0 | 0 | 0 | 10 | 20 | 30 |
| Notched Izod Impact Strength before Annealing (kg·cm/cm) | 2.5 | 5.2 | 7.3 | 15.4 | 6.1 | 7.8 | 14.0 |
| Notched Izod Impact Strength after Annealing (kg·cm/cm) | 1.8 | 2.9 | 4.1 | 8.5 | 4.5 | 5.2 | 9.6 |
| Heat Distortion Temperature (°C.) | 84 | 73 | 67 | 55 | 70 | 63 | 52 |

As set forth in Table 2 regarding the comparative examples, values of impact strength after annealing deteriorate, and they are poorer than those of the multi-phase structure thermoplastic resins regarding the present invention.

COMPARATIVE EXAMPLES 8 to 12

The same procedure as in Example 1 was repeated with the exception that amounts of the multi-phase structure thermoplastic resins were altered, in order to prepare specimens, and investigations were then made. The results are set forth in Table 3.

TABLE 3

| Comp. Example | 8 | 9 | 10 | 11 | 12 |
|---|---|---|---|---|---|
| Polyethylene Terephthalate (wt %) | 99.5 | 35 | 25 | 35 | 25 |
| Multi-phase Structure Thermoplastic Resin IIa (wt %) | 0.5 | 65 | 75 | — | — |
| Multi-phase Structure Thermoplastic Resin IIb (wt %) | — | — | — | 65 | 75 |
| Notched Izod Impact Strength before Annealing (kg·cm/cm) | 2.5 | not broken | not broken | not broken | not broken |
| Notched Izod Impact Strength after Annealing (kg·cm/cm) | 1.9 | not broken | not broken | not broken | not broken |
| Heat Distortion Temperature (°C.) | 84 | 25 or less | 25 or less | 25 or less | 25 or less |

As is apparent from the foregoing, when the amount of the multi-phase thermoplastic resin is in excess of 50% by weight, the molded articles lose the characteristics of polyethylene terephthalate, and inversely when the multi-phase thermoplastic resin is used in an amount of less than 1% by weight, its effect is not expected at all.

EXAMPLES 7 AND 8, AND COMPARATIVE EXAMPLES 13 to 15

The same procedure as in Example 1 and Comparative Example 1 was repeated with the exception that the polyethylene terephthalate was replaced with polybutylene terephthalate having an intrinsic viscosity of 1.9 dl/g, and investigations were then made. The results are set forth in Table 4.

TABLE 4

| | Ex. 7 | Ex. 8 | Comp. Ex. 13 | Comp. Ex. 15 | Comp. Ex. 16 |
|---|---|---|---|---|---|
| Polybutylene Terephthalate (wt %) | 90 | 80 | 100 | 90 | 40 |
| Multi-phase Structure Thermoplastic Resin IIa (wt %) | 10 | 10 | — | — | 60 |
| Multi-phase Structure Thermoplastic Resin IIb (wt %) | — | 10 | — | — | — |
| Unmodified Epoxy Group-Containing Ethylene Copolymer (wt %) | — | — | — | 10 | — |
| Notched Izod Impact Strength before Annealing (kg·cm/cm) | 11.2 | 20.1 | 5.0 | 10.5 | not broken |
| Notched Izod Impact Strength after Annealing (kg·cm/cm) | 11.5 | 19.5 | 4.8 | 10.7 | not broken |
| Heat Distortion Temperature (°C.) | 57 | 53 | 58 | 49 | 25 or less |

COMPARATIVE EXAMPLE 16

The same procedure as in Example 2 was repeated with the exception that the thermoplastic resin IIa was repalced with the multi-phase structure thermoplastic resin IIc. As a result, notched Izod impact strength before and after annealing were 5.0 kg·cm/cm and 2.8 kg·cm/cm, respectively, and heat distortion temperature was 68° C.

EXAMPLE 9

The same procedure as in Example 1 was repeated with the exception that 10 g of unmodified epoxy group-containing ethylene copolymer and 10 g of the graft polymerization precursor prepared in Preparation Example 1 were dry-blended with 80 g of polyethylene terephthalate having an intrinsic viscosity of 2.2 dl/g. As a result, notched Izod impact strength before and after annealing were 6.5 kg·cm/cm and 7.8 kg·cm/cm, respectively, and heat distortion temperature was 76° C.

EXAMPLES 10 TO 15

Polyethylene terephthalate having an intrinsic viscosity of 2.2 dl/g was dry-blended with a predetermined amount of the multi-phase structure thermoplastic resin IId or IIe prepared in Preparation Examples 4 and 5, and the same procedure as in Example 1 was then taken to measure physical properties. The results are set forth in Table 5.

TABLE 5

| Example | 10 | 11 | 12 | 13 | 14 | 15 |
|---|---|---|---|---|---|---|
| Polyethylene Terephthalate (wt %) | 95 | 90 | 80 | 70 | 90 | 70 |
| Multi-phase Structure Thermoplastic Resin IId (wt %) | 5 | 10 | 20 | 30 | — | — |
| Multi-phase Structure Thermoplastic Resin IIe (wt %) | — | — | — | — | 10 | 30 |
| Notched Izod Impact Strength before Annealing | 4.3 | 5.1 | 6.8 | 8.7 | 4.6 | 8.3 |

TABLE 5-continued

| Example | 10 | 11 | 12 | 13 | 14 | 15 |
|---|---|---|---|---|---|---|
| (kg·cm/cm) | | | | | | |
| Notched Izod Impact Strength after Annealing (kg·cm/cm) | 4.4 | 4.9 | 6.5 | 7.9 | 4.6 | 7.8 |
| Heat Distortion Temperature (°C.) | 83 | 83 | 76 | 71 | 81 | 71 |

COMPARATIVE EXAMPLE 17 TO 20

The same procedure as in Example 10 was repeated with the exception that multi-phase structure thermoplastic resin was substituted with the unmodified ethylene/ethyl acrylate copolymer used in Preparation Example 4. The results are set forth in Table 6.

TABLE 6

| Comp. Example | 17 | 18 | 19 | 20 |
|---|---|---|---|---|
| Polyethylene Terephthalate (wt %) | 95 | 90 | 80 | 70 |
| Unmodified Ethylene-Ethyl Acrylate Copolymer (wt %) | 5 | 10 | 20 | 30 |
| Notched Izod Impact Strength before Annealing (kg·cm/cm) | 2.5 | 5.4 | 3.4 | 1.9 |
| Notched Izod Impact Strength after Annealing (kg·cm/cm) | 1.8 | 2.7 | 1.5 | 0.8 |
| Heat Distortion Temperature (°C.) (18.6 kg/cm$^2$) | 84 | 76 | 69 | 54 |

COMPARATIVE EXAMPLES 21 TO 25

The same procedure as in Example 10 was repeated with the exception that the amount of the multi-phase structure thermoplastic resin was changed, in order to prepare specimens, and investigations were made. The results are set forth in Table 7.

TABLE 7

| Comp. Example | 21 | 22 | 23 | 24 | 25 |
|---|---|---|---|---|---|
| Polyethylene Terephthalate (wt %) | 99.5 | 35 | 25 | 35 | 25 |
| Multi-phase Structure Thermoplastic Resin IId (wt %) | 0.5 | 65 | 75 | — | — |
| Multi-phase Structure Thermoplastic Resin IIe (wt %) | — | — | — | 65 | 75 |
| Notched Izod Impact Strength before Annealing (kg·cm/cm) | 2.5 | 5.1 | 6.8 | 8.7 | 4.6 |
| Notched Izod Impact Strength after Annealing (kg·cm/cm) | 1.9 | not broken | not broken | not broken | not broken |
| Heat Distortion Temperature (°C.) (18.6 kg/cm$^2$) | 84 | <25 | <25 | <25 | <25 |

As is apparent from the foregoing, when the multi-phase structure thermoplastic resin is in excess of 50% by weight, molded articles thereof lose characteristics of polyethylene terephthalate. Inversely, when the multi-phase structure thermoplastic resin is used in an amount of less than 1% by weight, its effect cannot be obtained.

EXAMPLES 16 AND 17, AND COMPARATIVE EXAMPLES 26 TO 28

The same procedure as in Example 10 was repeated with the exception that the polyethylene terephthalate was replaced with polyethylene terephthalate having an intrinsic viscosity of 1.9 dl/g. The results are set forth in Table 8.

TABLE 8

| | Ex. 16 | Ex. 17 | Comp. Ex. 26 | Comp. Ex. 27 | Comp. Ex. 28 |
|---|---|---|---|---|---|
| Polybutylene Terephthalate (wt %) | 90 | 80 | 100 | 90 | 40 |
| Multi-phase Structure Thermoplastic Resin IId (wt %) | 10 | 10 | — | — | 60 |
| Multi-phase Structure Thermoplastic Resin IIe (wt %) | — | 10 | — | — | — |
| Unmodified Ethylene-Ethyl Acrylate Copolymer (wt %) | — | — | — | 10 | — |
| Notched Izod Impact Strength before Annealing (kg·cm/cm) | 9.3 | 15.4 | 5.0 | 9.1 | not broken |
| Notched Izod Impact Strength after Annealing (kg·cm/cm) | 9.5 | 16.1 | 4.8 | 5.2 | not broken |
| Heat Distortion Temperature (°C.) (18.6 kg/cm$^2$) | 56 | 52 | 58 | 46 | <25 |

COMPARATIVE EXAMPLE 29

The same procedure as in Example 11 was repeated with the exception that the thermoplastic resin IId was replaced with the multi-phase structure thermoplastic resin IIf. As a result, notched Izod impact strength before and after annealing were 4.1 kg·cm/cm and 2.5 kg·cm/cm, respectively, and heat distortion temperature was 56° C.

EXAMPLE 18

The same procedure as in Example 10 was repeated with the exception that unmodified ethylene/ethyl acrylate copolymer and 10 g of the graft polymerization precursor prepared in Preparation Example 4 were dry-blended with 80 g of polyethylene terephthalate having an intrinsic viscosity of 2.2 dl/g. As a result, notched Izod impact strength before and after annealing were 5.8 kg·cm/cm and 5.1 kg·cm/cm, respectively, and heat distortion temperature was 77° C.

EXAMPLE 19

The same procedure as in Preparation Example 4 was repeated with the exception that no radical polymerizable or copolymerizable organic peroxide was used, in order to prepare a graft polymerization precursor. The diameter of particles dispersed in this graft polymerization precursor was in the range of 0.1 to 0.3 μm.

Afterward, the same procedure as in Example 10 was repeated with the exception that the thus prepared graft polymerization precursor was used as multi-phase structure thermoplastic resin. As a result, notched Izod impact strength before and after annealing were 6.0 kg·cm/cm and 5.2 kg·cm/cm, respectively, and heat distortion temperature was 80° C.

EXAMPLE 20

Eighty grams of the polyethylene terephthalate used in Example 10 was blended with 10 g of the graft polymerization precursor (diameter of dispersed particles=0.1 to 0.3 μm) prepared in Preparation Example 4, 5 g of the unmodified ethylene-ethyl acrylate copolymer used in Preparation Example 4 and 5 g of styrene polymer (trade name Diarex HF-55; made by Mitsubishi Monsanto Chemical Co.), and the mixture was then extruded at 260° C. Afterward, physical properties were measured in accordance with the procedure of Example 10. As a result, notched Izod impact strength before and after annealing were 5.3 kg·cm/cm and 5.4 kg·cm/cm, respectively, and heat distortion temperature was 79° C.

EXAMPLES 21 TO 24

The same procedures as in Examples 1 and 7 were repeated with the exception that glass fiber and talc were used in ratios in Table 9, in order to prepare specimens, and notched Izod impact strength and heat distortion temperatures were then measured. The results are set forth in Table 9.

TABLE 9

| Example | 1 | 21 | 22 | 23 | 7 | 24 |
|---|---|---|---|---|---|---|
| Composition (parts by weight) | | | | | | |
| Polyethylene Terephthalate | 95 | 95 | 95 | 95 | — | — |
| Polybutylene Terephthalate | — | — | — | — | 90 | 90 |
| Multi-phase Structure Thermoplastic Resin IIa | 5 | 5 | 5 | 5 | 10 | 10 |
| Glass Fiber* | — | 20 | 50 | 70 | — | 30 |
| Talc | — | 1.5 | 1.7 | 2.0 | — | — |
| Notched Izod Impact Strength (kg · cm/cm) | 5.8 | 8.2 | 10.4 | 11.1 | 11.2 | 16.9 |
| Heat Distortion Temperature (°C.) | 83 | 181 | 235 | 242 | 57 | 215 |

*Glass short fiber CS-3PE-231, made by Nitto Boseki Co., Ltd.

EXAMPLE 25 TO 29

The same procedure as in Example 5 was repeated with the exception that flame retardants were used in ratios in Table 10, in order to prepare combustion specimens (1/16"×½"×5"). Vertical flame test was carried out in accordance with UL-94 standard. The results are set forth in Table 10.

TABLE 10

| Example | 5 | 25 | 26 | 27 | 28 | 29 |
|---|---|---|---|---|---|---|
| Composition (parts by weight) | | | | | | |
| Polyethylene Terephthalate | 90 | 90 | — | 90 | 90 | 90 |
| Polybutylene Terephthalate | — | — | 90 | — | — | — |
| Multi-phase Structure Thermoplastic Resin IIb | 10 | 10 | 10 | 10 | 10 | 10 |
| Glass Fiber* | — | 30 | — | — | — | — |
| Talc | — | 1.5 | — | — | — | — |
| Brominated Polystyrene** | — | 5 | 7 | 30 | — | — |
| Magnesium Hydroxide*** | — | — | — | — | 40 | 100 |
| Antimony Trioxide | — | 2 | 2 | 12 | — | — |
| UL94 Combustibility | V-2 | V-0 | V-0 | V-0 | V-2 | V-0 |

*It was as defined in Table 9.

**$-\mathrm{CH_2-CH}\frac{}{}-$ (n = 50)

***The average particle diameter was 5 μm.

The thermoplastic resin composition of the present invention can maintain heat resistance and can has high impact strength, and the present invention has the feature that the desired composition can be easily manufactured only by mixing raw materials under melting. In addition, the degree of the impact strength depends upon a blend ratio of multi-phase structure thermoplastic resin to be mixed, and therefore many kinds and small amounts of resin compositions can be easily manufactured. Moreover, even after molded articles made from the thermoplastic resin composition of the present invention are heated by, for example, annealing, the impact strength of the articles does not deteriorate characteristically.

In view of the features, the thermoplastic resin composition of the present invention can be widely used as materials for, e.g., automobile parts, electronic and electric parts, heat-resistant containers, industrial parts and the like.

What is claimed is:

1. A thermoplastic resin composition which comprises
  (I) 50 to 99% by weight of an aromatic polyester resin, and
  (II) 50 to 1% by weight of a multi-phase structure thermoplastic resin which is a graft copolymer of 5 to 95% by weight of epoxy group-containing ethylene copolymer, and 95 to 5% by weight of a vinyl polymer or copolymer obtained from at least one vinyl monomer, either of said components being formed with a dispersion phase having a particle diameter of 0.001 to 10 μm.

2. A thermoplastic resin composition according to claim 1 wherein said vinyl polymer or copolymer in said multi-phase structure thermoplastic resin has an average polymerization degree of 5 to 10,000.

3. A thermoplastic resin composition according to claim 1 wherein said aromatic polyester resin is composed of a dicarboxylic acid component containing 40 mol% or more of terephthalic acid and a diol component, and has an intrinsic viscosity of 0.4 to 4.0 dl/g.

4. A thermoplastic resin composition according to claim 1 wherein said multi-phase structure thermoplastic resin is a graft copolymer obtained by mixing and melting at 100° to 300° C.,
  1 to 100% by weight of a graft polymerization precursor (A) obtained by copolymerizing at least one vinyl monomer with at least one of radical polymerizable or copolymerizable organic peroxides represented by the following general formulae (a) and (b)

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2, in particles of an epoxy group-containing ethylene copolymer, 0 to 99% by weight of an epoxy group-containing ethylene copolymer, and 0 to 99% by weight of a vinyl polymer or copolymer (C) obtained by polymerizing or copolymerizing at least one vinyl monomer.

5. A thermoplastic resin composition according to claim 1 wherein said vinyl monomer is at least one vinyl monomer selected from the group consisting of vinyl aromatic monomers, acrylate and methacrylate monomers, acrylonitrile and methacrylonitrile monomers, and vinyl ester monomers.

6. A thermoplastic resin composition according to claim 1 wherein said ethylene copolymer is an epoxy group-containing ethylene copolymer which is composed of 60 to 99.5% by weight of ethylene, 40 to 0.5% by weight of glycidyl acrylate or methacrylate, and 0 to 39.5% by weight of another unsaturated monomer.

7. A thermoplastic resin composition according to claim 1 wherein in said vinyl polymer or copolymer, 50% by weight or more of said vinyl monomer is an acrylate or methacrylate.

8. A thermoplastic resin composition according to claim 1 containing an inorganic filler (III) blended in an amount of 1 to 150 parts by weight based on 100 parts by weight of said thermoplastic resin composition (I)+(II).

9. A thermoplastic resin composition according to claim 1 containing a flame retardant (IV) blended in an amount of 5 to 150 parts by weight based on 100 parts by weight of said thermoplastic resin composition (I)+(II).

10. A method for preparing a thermoplastic resin composition which comprises the step of melting and mixing, at 100°-300° C., an aromatic polyester resin (I) with

1 to 100% by weight of a graft polymerization precursor (A) which is obtained by first adding at least one vinyl monomer, at least one radical polymerizable or copolymerizable organic peroxide and a radical polymerization initiator to an aqueous suspension of an epoxy group-containing ethylene copolymer, then heating said suspension under such conditions that the decomposition of said radical polymerization initiator does not occur substantially, in order to impregnate said epoxy group-containing ethylene copolymer with said vinyl monomer, said radical polymerizable or copolymerizable organic peroxide and said radical polymerization initiator, and raising the temperature of said aqueous suspension, when the degree of said impregnation has reached at least 50% by weight of the original total weight of said vinyl monomer, peroxide and initiator, in order to copolymerize said vinyl monomer with said radical organic peroxide in said ethylene copolymer,

0 to 99% by weight of an epoxy group-containing ethylene copolymer (B), and 0 to 99% by weight of a vinyl polymer or copolymer (C) obtained by polymerizing at least one vinyl monomer, or alternatively melting and mixing said components (A), (B) and (C) previously at a temperature in the range of 100° to 300° C., and then melting and mixing the resulting mixture with said aromatic polyester resin (I).

11. A method for preparing a thermoplastic resin composition according to claim 10 wherein said radical polymerizable or copolymerizable organic peroxide is one or a mixture of two or more of peroxycarbonate compounds represented by the following general formula (a) and (b)

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2.

12. A method for preparing a thermoplastic resin composition according to claim 10 wherein said vinyl polymer or copolymer in said multi-phase structure thermoplastic resin has an average polymerization degree of 5 to 10,000.

13. A method for preparing a thermoplastic resin composition according to claim 10 wherein said aromatic polyester resin is composed of a dicarboxylic acid component containing 40 mol% or more of terephthalic acid and a diol component, and has an intrinsic viscosity of 0.4 to 4.0 dl/g.

14. A method for preparing a thermoplastic resin composition according to claim 10 wherein said vinyl monomer is at least one vinyl monomer selected from the group consisting of vinyl aromatic monomers, acrylate and methacrylate monomers, acrylonitrile and methacrylonitrile monomers, and vinyl ester monomers.

15. A method for preparing a thermoplastic resin composition according to claim 10 wherein said epoxy group-containing ethylene copolymer is composed of 60 to 99.5% by weight of ethylene, 40 to 0.5% by weight of glycidyl acrylate or methacrylate, and 0 to 39.5% by weight of another unsaturated monomer.

16. A method for preparing a thermoplastic resin composition according to claim 10 wherein in said vinyl polymer or copolymer, 50% by weight or more of said vinyl monomer is an acrylate or methacrylate.

17. A method for preparing a thermoplastic resin composition according to claim 10 wherein an inorganic filler (III) is additionally blended in an amount of 1 to 150 parts by weight based on 100 parts by weight of said thermoplastic resin composition (I)+(II).

18. A method for preparing a thermoplastic resin composition according to claim 10 wherein a flame retardant (IV) is additionally blended in an amount of 5 to 150 parts by weight based on 100 parts by weight of said thermoplastic resin composition (I)+(II).

19. A method for preparing a thermoplastic resin composition according to claim 11 wherein said vinyl polymer or copolymer in said multi-phase structure thermoplastic resin has an average polymerization degree of 5 to 10,000, said aromatic polyester resin is composed of a dicarboxylic acid component containing 40 mol % or more of terephthalic acid and a diol component and has an intrinsic viscosity of 0.4 to 4.0 dl/g and said epoxy group-containing ethylene copolymer is composed of 60 to 99.5% by weight of ethylene, 40 to 0.5% by weight of glycidyl acrylate or methacrylate and 0 to 39.5% by weight of another unsaturated monomer.

20. A thermoplastic resin composition according to claim 6 wherein said vinyl polymer or copolymer in said multi-phase structure thermoplastic resin has an average polymerization degree of 5 to 10,000, said aromatic polyester resin is composed of a dicarboxylic acid component containing 40 mol % or more of terephthalic acid and a diol component and has an intrinsic viscosity of 0.4 to 4 dl/g and said particle diameter is 0.01 to 5 μm.

* * * * *

UNITED STATES PATENT AND TRADEMARK OFFICE
CERTIFICATE OF CORRECTION

PATENT NO. : 5,175,204
DATED : December 29, 1992
INVENTOR(S) : Yuichi Orikasa et al.

It is certified that error appears in the above-identified patent and that said Letters Patent is hereby corrected as shown below:

Title page, item [73] Assignee: should read
--Nippon Petrochemicals Co., Ltd., Japan and Nippon Oil & Fats Co., Ltd., Japan--.

Signed and Sealed this

Eighth Day of February, 1994

BRUCE LEHMAN

Attest:

Attesting Officer

Commissioner of Patents and Trademarks